No. 795,182. PATENTED JULY 18, 1905.
L. WILSON.
PROTECTIVE SYSTEM FOR PARALLEL LINES.
APPLICATION FILED NOV. 20, 1903.

3 SHEETS—SHEET 1.

WITNESSES:

INVENTOR.
Leonard Wilson,
BY
ATTORNEY.

No. 795,182.

Patented July 18, 1905.

UNITED STATES PATENT OFFICE.

LEONARD WILSON, OF PITTSFIELD, MASSACHUSETTS, ASSIGNOR TO STANLEY ELECTRIC MANUFACTURING COMPANY, OF PITTSFIELD, MASSACHUSETTS, A CORPORATION OF NEW JERSEY.

PROTECTIVE SYSTEM FOR PARALLEL LINES.

SPECIFICATION forming part of Letters Patent No. 795,182, dated July 18, 1905.

Application filed November 20, 1903. Serial No. 181,926.

*To all whom it may concern:*

Be it known that I, LEONARD WILSON, a subject of the King of England, and a resident of Pittsfield, Massachusetts, have invented certain new and useful Improvements in Protective Systems for Parallel Lines, of which the following is a specification.

My invention relates to protective devices for a plurality of parallel transmission-lines or parallel feeder systems in which parallel lines are connected at the generating and at the receiving ends. In such systems under normal conditions the load is divided equally among the several lines. If, however, a short circuit occurs on any one of the lines, that line draws an excess current, which produces a detrimental effect either by lowering the voltage or by overloading the generating-station. In case of such a short circuit on one of the lines it is necessary in order to preserve continuity of service that the faulty line should be cut out, leaving the healthy lines to carry the load.

The object of my invention is to provide a system of protective devices for such parallel lines or parallel feeders which shall be simple in form and positive in action and which shall be applicable to any number of parallel lines.

A further object of my invention consists in so arranging the protective devices that after one line or feeder has been cut out the protective devices shall still be in readiness to cut out a second parallel line should it also become short-circuited, and so on with the remaining lines.

In my protective devices I take advantage of the fact that under normal conditions the current in all the lines is approximately equal, while upon the occurrence of a short circuit or other fault the current in the several lines is unbalanced. Accordingly I use a differential device for each feeder having two opposed windings, one of which is energized by the current in a single feeder or line, while the other winding is energized by the sum of all the currents, the two windings being so proportioned that under normal conditions their effects are balanced. I further provide means for restoring the balance of these differential devices when one line is cut out.

My invention will best be understood by reference to the accompanying drawings, in which—

Figure 1:
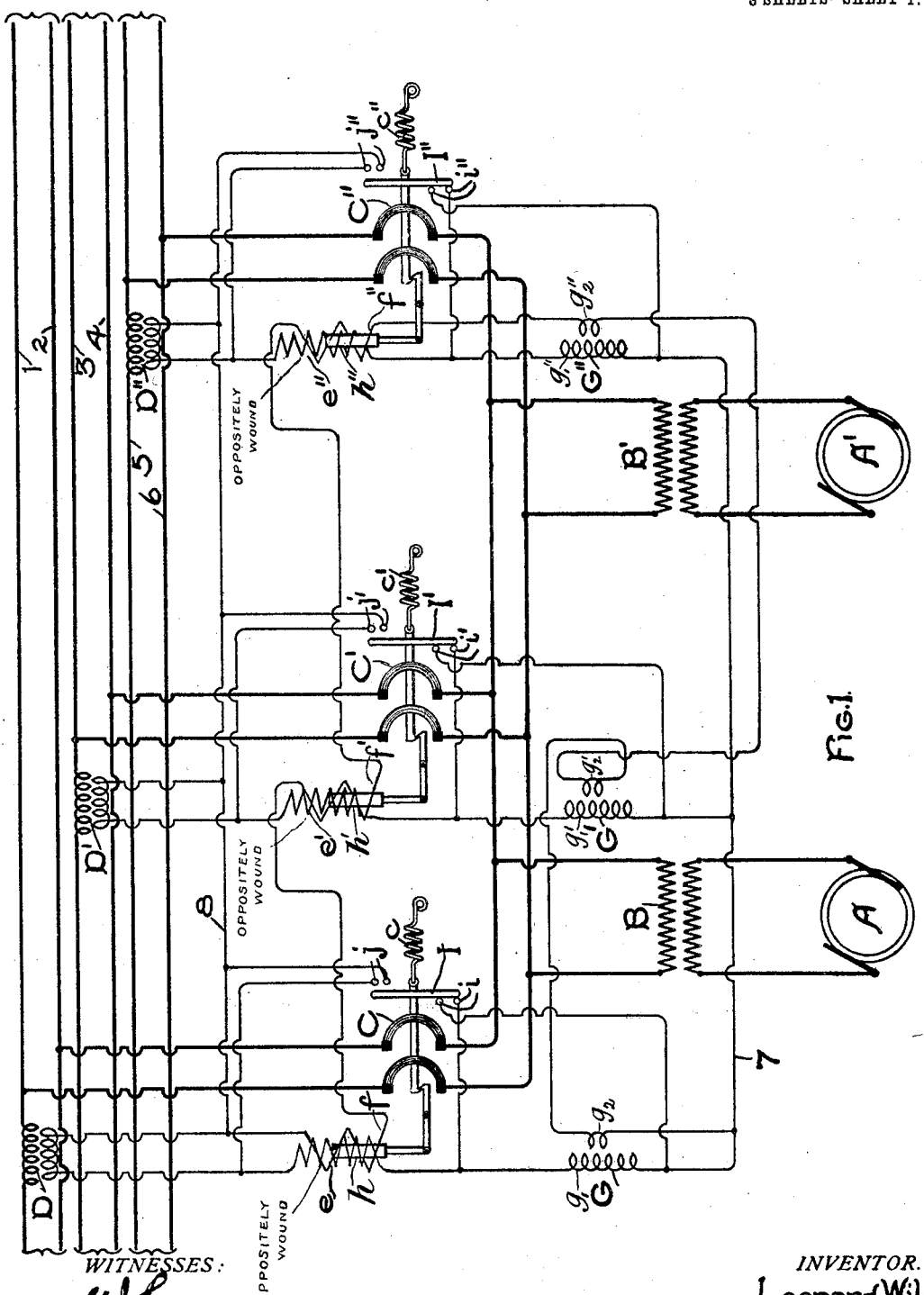
Figure 2:
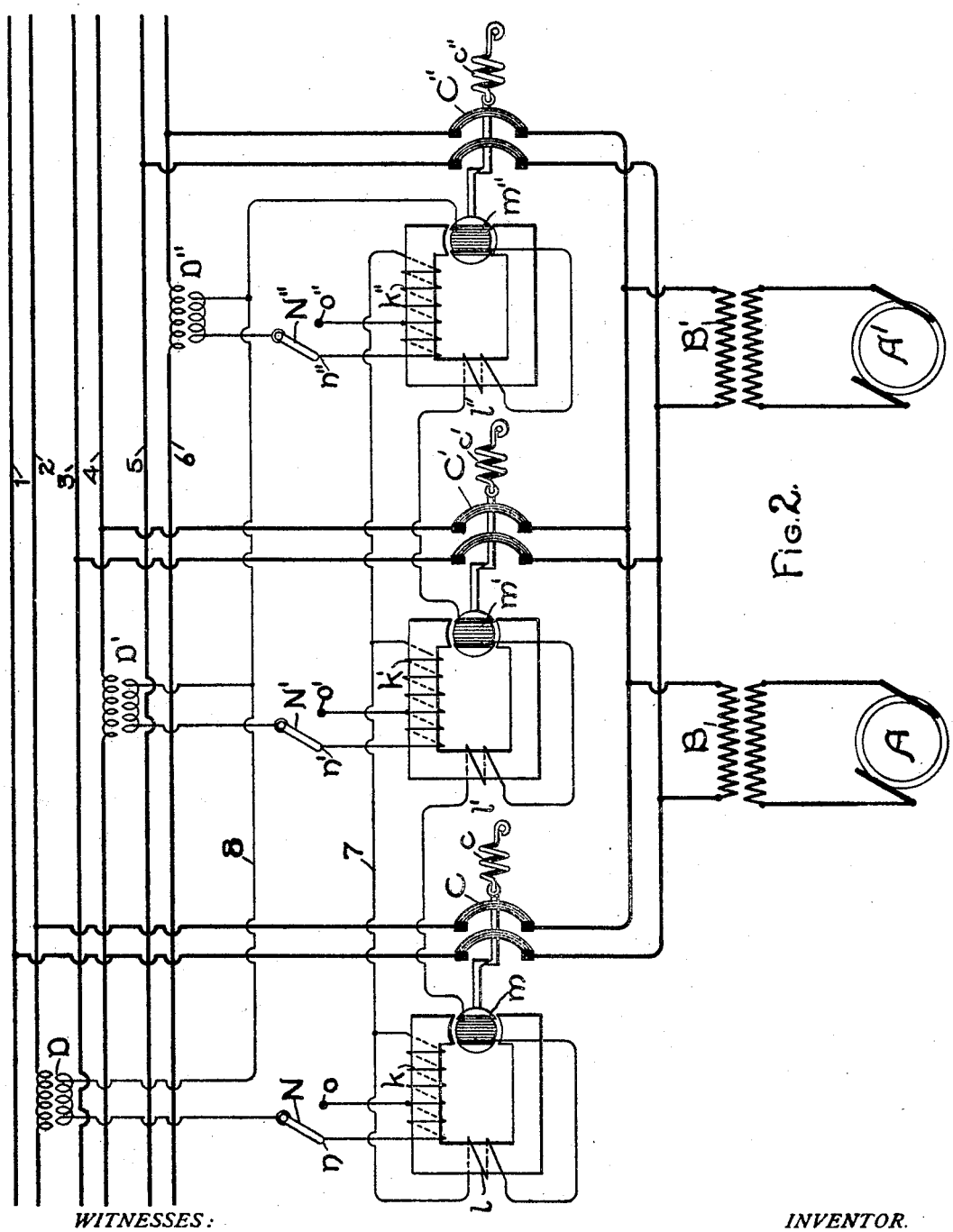
Figure 3:
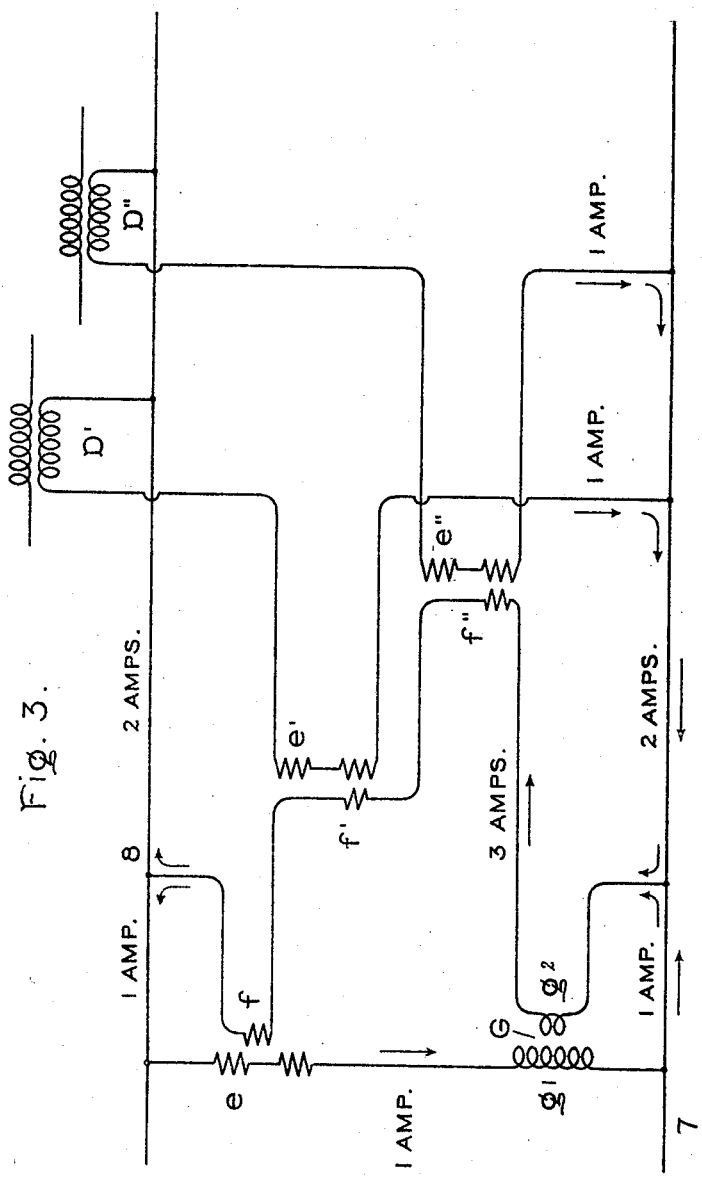

Figure 1 shows an arrangement of protective devices embodying my invention, and Fig. 2 shows a modification of the same. Fig. 3 shows a simplified diagram of the parts of the system which are in operation after one tripping device has been actuated.

In Fig. 1 are shown two generators A A', connected in parallel through the transformers B B' and through the switches C C' C'' to the parallel lines 1 2, 3 4, and 5 6. The circuits thus far described comprise the main circuits and are shown in heavy lines. The remaining circuits are shown in light lines and are the circuits of the controlling and protective devices. D D' D'' are series transformers included in the respective parallel lines. The secondary of each of these transformers is connected at the left-hand end through coils $e\ e'\ e''$ and through transformer-windings $g_1\ g'_1\ g''_1$ of transformers G G' G'' to the common conductor 7. The common conductor 7 is connected through the windings $g_2\ g'_2\ g''_2$ in series of transformers G G' G'' and through the windings $f''$, $f'$, and $f$ in series to the common conductor 8, to which the right-hand ends of the series transformers D D' D'' are also connected. Neglecting for a moment transformers G G' G'', it will be seen that the current from each secondary of the series transformers D D' D'' passes through the windings $e\ e'\ e''$ to a common conductor and the sum of all the currents returns through windings $f''\ f'\ f$ to the common conductor 8. Thus the current in winding $f$ is three times the current in winding $e$ under normal conditions, and winding $f$ is shown with one-third the number of turns of winding $e$. Thus the ampere-turns of the two windings, which are oppositely wound, are equal, and no resultant pull is exerted upon the core $h$. If, however, line 1 2 becomes short-circuited, the current in that line will be greater than one-third the sum of all the currents. The current in winding $e$ will consequently be more than one-third the current in winding $f$. Winding $e$ will consequently predominate, and core $h$ will be drawn upward, releasing the catch of switch C, which will be opened by the tension-spring $c$, disconnecting the line 1 2 from the generators. It will be understood that though the winding $e$ is shown with three times the number of turns of winding $f$, since three parallel lines are shown, the proper ratio of turns depends upon the number of feeders, the proper number of turns of winding $e$ being always equal to the number of turns of winding $f$ multiplied by the number of parallel lines—that is, in every case the ampere-turns of the two windings should be equal. It is evident that after one of the parallel lines is cut out the current in each of the remaining lines will be one-half the sum of the currents. Consequently were it not for the transformers G G' G'' the differential devices would no longer be properly wound for cutting out another of the parallel lines should it fail. The purpose of transformers G G' G'' is to preserve the balance of the differential devices whether one parallel line is cut out or not. It will be seen from Fig. 1 that as long as main switches C C' C'' are closed the windings $g_1$ $g'_1$ $g''_1$ of the series transformers G G' G'' are short-circuited by the bridging members I I' I'', carried by the main switches C C' C'' and coacting with contacts $i$ $i'$ $i''$. Thus until one of the main switches opens, cutting out one of the parallel lines, the transformers G G' G'' are of no effect. When, however, line 1 2 is cut out by the opening of switch C, the short circuit around winding $g_1$ of transformer G is removed and bridging member I bridges contacts $j$, short-circuiting the secondary of series transformers D. Series transformer G is wound with a three-to-one ratio, as shown. Consequently if current is flowing in one winding and the circuit of the other winding is closed an induced current will flow in the second winding and the ratio of the two currents will be three to one. Now with switch C open the circuits are as follows: One terminal of the secondary of each of transformers D' and D'' is connected to common conductor 8. The other terminal of each is connected to common conductor 7 through windings $e'$ and $e''$, respectively, transformer-windings $g'_1$ and $g''_1$ being still short-circuited, and consequently being left out of consideration. Conductor 8 and conductor 7 are joined, as has already been described, by the circuit through windings $f$, $f'$, $f''$, $g''_2$, $g'_2$, and $g_2$, of which $g''_2$ and $g'_2$ may be left out of consideration, as the other windings of these transformers are still short-circuited. Now if these circuits were all that were closed it is evident that the current through circuit $f$, $f'$, $f''$, and $g_2$ would be simply the sum of the currents in the secondaries of D' and D'', and consequently the current in windings $f'$ and $f''$ would be only twice the current in windings $e'$ and $e''$, which would produce an unbalancing of these two differential windings and a consequent opening of switches C' and C''. This is obviated, however, by the use of bridging member I on switch C, which, when switch C opens, leaves contacts $i$ $i$, thereby removing the short-circuit from winding $g_1$ and engages contacts $j$ $j$, thereby connecting winding $g_1$ and winding $e$ in series across conductors 7 and 8. Thus another closed circuit is formed between conductors 7 and 8 in parallel to the circuit $f$ $f'$ $f''$ $g_2$. The two circuits, however, do not act like ordinary shunt-circuits, dividing the current between them according to their impedances, and this is because of the series transformer G. Series transformer G has one winding in each of the parallel circuits, and consequently determines the ratio of the currents in the two circuits, this ratio being equal to the ratio of the numbers of turns of the two windings—viz., three to one—that is, the current in the circuit of winding $g_2$ must be three times the current in the circuit of winding $g_1$. Moreover, from the well-known transformer principle it is evident that the currents in the two windings are in opposite directions—that is, the circuit of winding $g_1$, instead of acting as a shunt for the circuit of winding $g_2$ and taking a part of its current, has induced in it by the series-transformer action a current in the opposite direction to that in the circuit of winding $g_2$, for which current the circuit of winding $g_2$ must act as return-conductor. Consequently the circuit of winding $g_2$ must act as a return-conductor, not only for the currents in transformer secondaries D' and D'', but also for the current in winding $g_1$. In other words, the current in winding $g_2$ is equal to three times the current in winding $g_1$, while the difference between these two currents equals the sum of the currents in secondaries D' and D''. For instance, if the current in each secondary of transformers D' and D'' is one ampere the current in $g_2$ will be three amperes and the current in $g_1$ one ampere, and as regards direction of flow if the current at any instant is considered as flowing out of secondaries D' and D'' through windings $e'$ and $e''$ to conductor 7 the direction of current in winding $g_2$ at the same instant will be from conductor 7 to conductor 8, while the direction in winding $g_1$ is from conductor 8 to conductor 7. Thus it is evident that because of the action of series transformer G the current in all three differential devices is of the proper amount and proper direction for maintaining the balanced differential action. Thus by the three-to-one series transformers G G' G'' the proper relation of current-flow in the windings of all the differential devices is maintained. The distribution of current, as described above, is clearly shown in Fig. 3, which is a simplified diagram showing only the parts of the system which are in operation after the switch C has been opened. The direction of current is indicated by the arrows, and the amount of current in each conductor is indicated. If a second line should short-circuit and its switch open, the differential windings would still have the proper value of current, since a second series transformer G' would have its short circuit removed and would come into play and properly maintain the value of current. Thus my protective devices may be used for any number of parallel lines and will remain properly balanced and ready for action no matter how many of the parallel lines are open-circuited, and this adjustment is entirely automatic.

In Fig. 2 another arrangement is shown in which a different form of differential device is shown, while the balancing of the devices after one line is cut out is obtained mechanically instead of electrically, as in the arrangement of Fig. 1. In the differential device as shown in Fig. 2 a small motor is used having two opposing field-coils and an armature restrained from movement in one direction and arranged by its movement in the other direction to unlatch the main switches C C' C''. The windings $k\ k'\ k''$ are each connected at one end to the series transformers and are connected at the other end to a common conductor 7. Windings $l\ l'\ l''$ are connected in series from this common conductor 7 through the armatures $m\ m'\ m''$ in series to the common conductor 8, to which the other ends of the series transformers D D' D'' are connected. Windings $l\ l'\ l''$ and armatures $m\ m'\ m''$ thus receive the sum of the currents in the secondaries of the series transformers. Windings $l\ l'\ l''$ are opposed magnetically to windings $k\ k'\ k''$ and have one-third as many turns. The normal ampere-turns of the differential devices are therefore equal, and under normal conditions no turning effort is impressed upon the armatures. If, however, one set of lines, as 1 2, becomes short-circuited, the field-winding $k$ of its differential device overpowers the field-winding $l$, and armature $m$ is rotated, releasing switch C, which is immediately opened by the tension-spring $c$. In order to restore the windings of the differential devices to their proper proportion, switches N N' N'' are provided, adapted to be moved from the terminal connections $n\ n'\ n''$ of the windings $k\ k'\ k''$ to the taps $o\ o'\ o''$, thereby cutting out one-third of the turns of field-windings $k\ k'\ k''$. The ratio of turns in the two field-windings of each device is thus two to one, which is the same ratio that the sum of the currents in the lines now bears to the currents in the single line.

I have thus shown two forms of differential protective devices adapted to my invention and two different methods of returning the devices to their proper relations for further action after one parallel line has been cut out. Other forms of differential devices and other methods of restoring their balances may be employed without departing from the spirit of my invention. For instance, although I have shown a differential device in which the two windings are opposed magnetically, and although I have shown the device applied directly to the main switch to trip it, it is obvious that any well-known and equivalent arrangement may be used in place of this specific form without departing from the spirit of my invention. Accordingly I do not desire to limit myself to the particular construction and arrangement of parts here shown, since changes therein which do not depart from the spirit of my invention and which are within the scope of the appended claims will be obvious to those skilled in the art.

Having thus fully described my invention, I claim as new and desire to protect by Letters Patent—

1. In combination with a plurality of parallel transmission-lines, a differential device for each line energized by the current in that line and by the sum of the currents in all the lines, and a switch in the circuit of each line and arranged to be operated by said device upon an unbalancing of the opposing forces in said device.

2. In combination, a plurality of parallel transmission-lines, a device having a movable member and two windings energized respectively by the current in a single line and by the sum of the currents in all the lines, said windings being arranged to produce normally equal and opposite forces in said device, and a switch arranged to be operated by a movement of said movable member upon an unbalancing of the opposing forces in said device.

3. In combination, a plurality of parallel transmission-lines, a differential device, means for imposing on said device two opposing forces normally equal but varying in amount with the current in one of said lines and with the sum of the currents in all said lines respectively, and a switch arranged to be operated by said device upon an unbalancing of the opposing forces in said device.

4. In combination, a plurality of parallel transmission-lines, a differential device having two opposing windings of normally equal ampere-turns, said windings being energized respectively by the current in one line and by the sum of the currents in all the lines, and a switch arranged to be operated by said device upon an unbalancing of the opposing forces in said device.

5. In combination, a plurality of parallel transmission-lines, a differential device having two opposing windings energized respectively by the current in one of said lines and by the sum of the currents in all said lines, said two windings having a number of turns bearing to each other a ratio equal to the ratio of the number of said lines to one, and a switch arranged to be operated by said device upon an unbalancing of the opposing forces in said device.

6. In combination, a plurality of parallel transmission-lines, a differential device, means for imposing on said device two opposing forces normally equal but varying in amount with the current in one of the lines and with the sum of the currents in all said lines respectively, means for restoring the normal equality of said forces when one of said lines is cut out, and a switch arranged to be operated by said device upon an unbalancing of the opposing forces in said device.

7. In combination, a plurality of transmission-lines in parallel, a device having two windings energized respectively by the current in one of said lines and by the sum of the currents in all of said lines, said windings being arranged to produce opposing and equal forces in said device when the currents in said lines are equal, means for maintaining the equality of said forces regardless of how many of said lines are at any time in operation, and a switch arranged to be operated by said device upon an unbalancing of the opposing forces in said device.

8. In combination, a plurality of parallel lines, a switch in the circuit of each line, a tripping device for each switch having two windings energized respectively by the current in one line and by the sum of the currents in all said lines, said windings being arranged to produce opposing and balanced forces in said device when the currents in all said lines are equal and to produce unbalanced forces in said device when the currents in said lines are unequal and operative connections between the switch and the device whereby the switch is tripped upon the unbalancing of forces in said device.

Signed at Pittsfield, Massachusetts, this 17th day of November, 1903.

LEONARD WILSON.

Witnesses:
L. A. HAWKINS,
R. E. HUYNES.